United States Patent Office 3,230,932
Patented Jan. 25, 1966

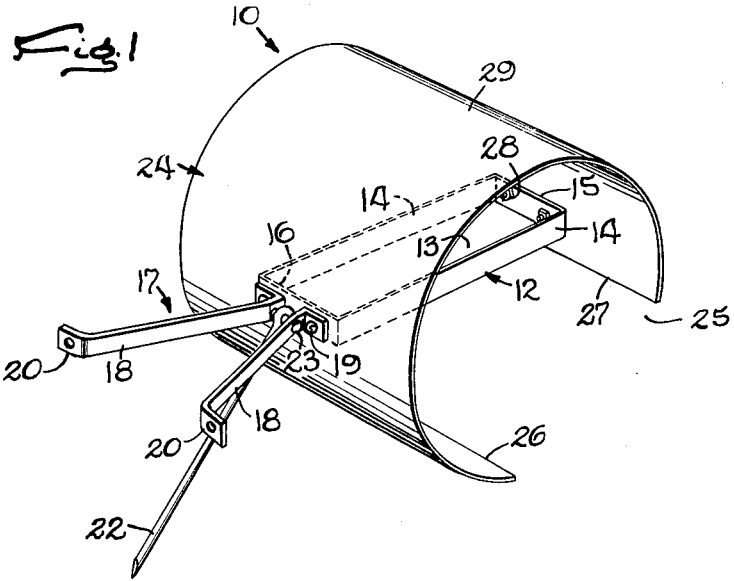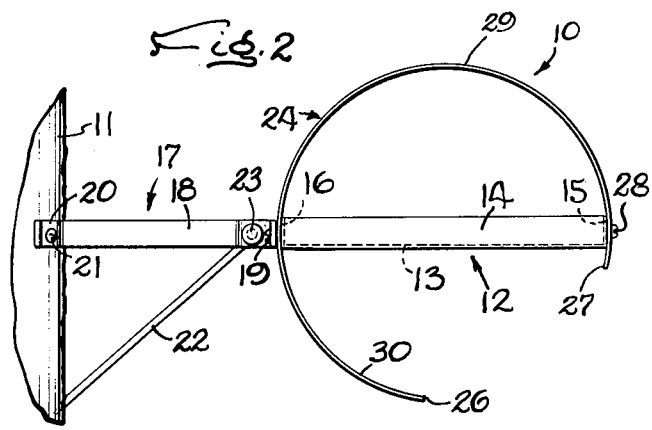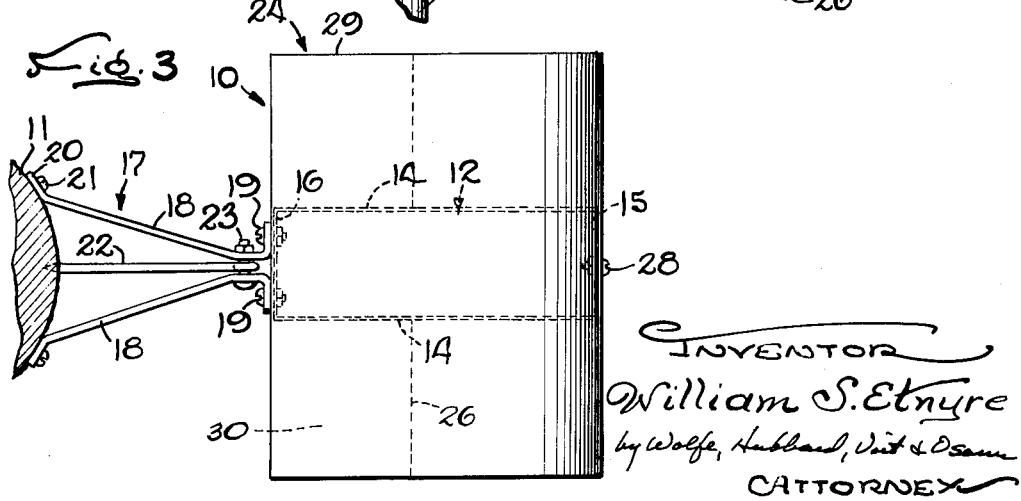

3,230,932
PROTECTED BIRD FEEDER
William S. Etnyre, c/o George Etnyre, Oregon, Ill.
Filed Jan. 31, 1964, Ser. No. 341,692
2 Claims. (Cl. 119—51)

This invention relates to a bird shelter or feeder adapted to be mounted on an upright support such as a tree trunk, and relates more particularly to a bird feeder constructed to protect the birds and the feed from climbing animals such as squirrels and cats. Those who have attempted to provide a supply of feed for birds in a conventional feeder have discovered that squirrels are capable of climbing or jumping to almost any feeder, and quickly dispose of the feed intended for the birds. Moreover, predators such as cats often attack feeding birds and also are capable of climbing trees for this purpose.

One object of the present invention is to provide an improved bird feeder of the foregoing character that effectively denies access to climbing animals while having substantial open space permitting access by birds and observation of the birds during feeding.

Another object is to provide such a feeder that is simple and inexpensive in construction and attractive in appearance.

A further object is to deny access to animals other than birds to a feeder mounted closely adjacent a tree trunk within the jumping range of squirrels.

Other objects and advantages of the invention will become apparent from the following detailed description taken in connection with the accompanying drawings, in which FIGURE 1 is a perspective view of a protected bird feeder embodying the novel features of the present invention.

FIG. 2 is a fragmentary side elevation showing the feeder mounted on a tree trunk.

FIG. 3 is a fragmentary plan view of the feeder in FIG. 2.

As shown in the drawings for purposes of illustration, the invention is embodied in a bird feeder 10 conveniently mountable on the side of a tree trunk 11 in a position close to the trunk. To hold a supply of feed, the feeder includes a feeding platform 12 herein in the form of a rectangular tray formed by a rectangular bottom 13, narrow upright side wall 14, and narrow end walls 15 and 16.

The tray 12 is supported on the trunk 11 in a horizontal position by a mounting bracket 17 comprising two bars 18 with their outer ends fastened by bolts 19 to the end wall 16 of the tray and having outwardly bent ends 20 with holes for receiving lag screws 21 or the like to fasten the feeder to the tree. An elongated spike 22 is pivoted at one end on the shank of a bolt 23 adjacent the outer ends of the mounting bars and its free end is pointed to stick into the tree below the feeder and brace the latter.

In accordance with the present invention, the tray 12 is protected by a novel, simple, and attractive shield 24 which effectively denies access to climbing animals such as squirrels without unduly interfering with access by the birds or observation of the birds using the feeder. To these ends the shield is composed of a smooth and hard material on which climbing animals cannot gain a foothold, and is shaped to prevent animals from jumping or climbing to the feeding tray from the trunk 11 of the tree.

For these purposes, the shield 24 preferably is composed of sheet metal and is cylindrically curved through an arc substantially less than 360° to leave an opening 25 on one side defined between two spaced free edges 26 and 27 of the sheet. The ends of the shield also are open. The feeding tray 12 is disposed along a diameter of the shield approximately midway between the open ends thereof and is substantially narrower than the length of the shield and the same length as the inside diameter of the shield. One free edge 27 of the shield is adjacent the outer end wall 15 of the tray and the other edge 26 is disposed beneath the tray.

With the tray 12 in this position, it is secured to the shield 24 by suitable fasteners such as bolts 28 extending through alined holes in the shield and the outer end wall 15. The bolts 19 fastening the inner end wall 16 to the mounting bars 18 also fasten the shield to the tray and the mounting bars.

Mounted in this manner, the upper portion 29 of the shield 24 curves through an arc of approximately 180° first upwardly and outwardly away from the tree 11 and then downwardly to the outer end of the tray 12 to cover the tray completely while leaving adequate space above the tray for feeding birds. The lower portion 30 of the shield curves downwardly and outwardly beneath the tray through an arc of approximately 90° and terminates in the free lower edge 26. The lower portion is made short enough to insure that the inner surface adjacent the lower edge is inclined downwardly and outwardly.

Thus, the top of the feeding tray 12 is completely covered by the semi-cylindrical upper portion 29 of the shield which affords no foothold for a squirrel and from which squirrels cannot reach the tray. Moreover, the quarter cylindrical lower portion 30 of the shield prevent squirrels from reaching or jumping upwardly from the tree to the tray. Accordingly the only possible avenue of approach is through the open ends of the shield, and the only way squirrels can reach the open ends is by jumping from the tree trunk.

The projecting end portions of the shield 24 prevent squirrels from jumping directly to the tray 12, and the downwardly inclined, slippery interior of the lower portion 30 and the opening 25 prevent squirrels from jumping onto the shield and then climbing to the tray. It will be seen, therefore, that the shield effectively denies squirrels and other climbing animals access to the feeding tray. Of course, the simple sheet metal shield, the tray, and the mouting bracket 17 are very simple and economical to manufacture.

I claim as my invention:

1. A protected bird feeder having, in combination, a feeding platform of predetermined length and width adapted to be disposed in a horizontal position with one end adjacent but spaced outwardly from a tree trunk, a bracket for supporting said platform on the trunk, a cylindrically curved shield longer than said width and having an inside diameter equal to said length and composed of hard and smooth sheet material curving through an arc of approximately 270° and passing between said bracket and said one platform end, said shield having open ends for the entry of birds and said platform being disposed within the shield approximately midway between said shield ends and lying along a diameter of the shield with a semi-cylindrical upper portion of the shield curving upwardly and outwardly over the platform from end to end and a quarter-cylindrical lower portion of the shield curving downwardly and outwardly beneath the platform and terminating in a free edge portion having a slight downward and outward incline, means fastening said shield to the outer end of said platform, and means fastening said bracket to said platform and said shield at the inner end of the platform.

2. A protected bird feeder having in combination, a platform, means for mounting said platform on a tree trunk in a generally horizontal position close to but spaced outwardly from said tree trunk, and a cylindrically curved shield composed of hard and smooth material curving through an arc of approximately 270° and having open ends for the entry of birds, said shield being supported by said mounting means in a position spaced from said trunk between the latter and said platform with an upper portion curving upwardly and outwardly away from said mounting means and downwardly to the end of said platform remote from the trunk to cover the platform, and with a lower portion curving downwardly and outwardly from said mounting means beneath the platform through an arc of approximately 90° whereby said shield opens downwardly and away from the trunk and denies access to the platform from the trunk.

References Cited by the Examiner
UNITED STATES PATENTS

| | | | |
|---|---|---|---|
| 2,151,010 | 3/1939 | Copeman | 119—51 X |
| 2,184,633 | 12/1939 | Copeman | 119—51 |
| 2,392,532 | 1/1946 | Hyde | 119—51 X |
| 3,017,858 | 1/1962 | Brown | 119—51 X |

SAMUEL KOREN, *Primary Examiner.*

HUGH R. CHAMBLEE, *Examiner.*